United States Patent
Matsui et al.

(10) Patent No.: US 12,233,758 B2
(45) Date of Patent: Feb. 25, 2025

(54) VEHICLE SEAT (71) Applicant: TOYOTA BOSHOKU KABUSHIKI KAISHA, Aichi (JP)

(72) Inventors: Hayato Matsui, Aichi (JP); Tatsuya Irie, Aichi (JP)

(73) Assignee: TOYOTA BOSHOKU KABUSHIKI KAISHA, Aichi (JP)

( * ) Notice: Subject to any disclaimer, the term of this patent is extended or adjusted under 35 U.S.C. 154(b) by 104 days.

(21) Appl. No.: 18/086,264

(22) Filed: Dec. 21, 2022

(65) Prior Publication Data
US 2023/0202354 A1 Jun. 29, 2023

(30) Foreign Application Priority Data

Dec. 28, 2021 (JP) ................. 2021-215041

(51) Int. Cl.
*B60N 2/16* (2006.01)
*B60N 2/68* (2006.01)
*B60N 2/18* (2006.01)

(52) U.S. Cl.
CPC .......... *B60N 2/1615* (2013.01); *B60N 2/165* (2013.01); *B60N 2/68* (2013.01); *B60N 2/168* (2013.01); *B60N 2/1695* (2013.01); *B60N 2/1864* (2013.01)

(58) Field of Classification Search
CPC ...... B60N 2/1615; B60N 2/165; B60N 2/168; B60N 2/1695; B60N 2/1864
See application file for complete search history.

(56) References Cited

U.S. PATENT DOCUMENTS

| 7,828,384 | B2* | 11/2010 | Shinozaki | B60N 2/168 297/344.14 |
| 10,239,422 | B2* | 3/2019 | Schulz | B60N 2/42709 |
| 10,518,664 | B2* | 12/2019 | Nagatani | B60N 2/045 |
| 10,744,909 | B2* | 8/2020 | Kong | B60N 2/10 |
| 2016/0107549 | A1* | 4/2016 | Janicek | B60N 2/43 297/216.1 |
| 2018/0334057 | A1 | 11/2018 | Nagatani | |

(Continued)

FOREIGN PATENT DOCUMENTS

| DE | 102014220131 | 1/2016 |
| DE | 102016200124 | 7/2017 |

(Continued)

OTHER PUBLICATIONS

Office Action issued in Corresponding German Patent Application No. 102022132282.3, dated Jul. 31, 2023, along with an English translation thereof.

*Primary Examiner* — Syed A Islam
(74) *Attorney, Agent, or Firm* — GREENBLUM & BERNSTEIN, P.L.C.

(57) ABSTRACT

Provided is a vehicle seat that can absorb energy with a link while maintaining engagement of gears in a lifting device. One embodiment of the present disclosure is the vehicle seat including a seat cushion, a cushion frame supporting the seat cushion, and the lifting device configured to raise and lower at least a portion of the seat cushion. The lifting device includes a pinion gear held by the cushion frame, a sector gear engaged with the pinion gear, and the link to which the sector gear is fixed and which is rotatably coupled to the cushion frame. The link is made of a material with a lower yield stress than a material forming the sector gear.

5 Claims, 5 Drawing Sheets

(56) References Cited

U.S. PATENT DOCUMENTS

2020/0164772 A1 5/2020 Kong et al.
2021/0387552 A1* 12/2021 Ohashi ................ B60N 2/1615

FOREIGN PATENT DOCUMENTS

| DE | 102018207150 | 11/2018 |
|----|--------------|---------|
| DE | 102019203863 | 5/2020 |
| JP | 6614023 | 12/2019 |

* cited by examiner

VEHICLE SEAT

CROSS-REFERENCE TO RELATED APPLICATIONS

This application claims the benefit of Japanese Patent Application No. 2021-215041 filed on Dec. 28, 2021 with the Japan Patent Office, the entire disclosure of which is incorporated herein by reference.

BACKGROUND

The present disclosure relates to a vehicle seat.

A seat mounted on a vehicle, such as an automobile, is provided with, for example, a lifting device such as a lifter device for moving a cushion frame up and down. The lifting device includes a pinion gear rotated manually or by a power source, a sector gear engaged with the pinion gear, and a link rotated together with the sector gear.

By rotation of the link integrated with the sector gear, the lifting device raises and lowers the cushion frame coupled to the link (see Japanese Patent No. 6614023).

SUMMARY

In order to maintain the engagement with the pinion gear, the sector gear is made of a material with high rigidity (that is, high yield stress). Therefore, rigidity of the link, which is integrated with the sector gear, is also increased.

In case of the link with high rigidity, energy at the time of impact such as a collision cannot be absorbed by deformation of the link, and the frame of the seat may be deformed. As a result, excessive deformation of the seat may occur.

In one aspect of the present disclosure, it is preferable to provide a vehicle seat that can maintain the engagement of the gears in the lifting device, and that can also absorb the energy with the link.

One embodiment of the present disclosure is a vehicle seat comprising a seat cushion, a cushion frame supporting the seat cushion, and a lifting device configured to raise and lower at least a portion of the seat cushion.

The lifting device comprises a pinion gear held by the cushion frame, a sector gear engaged with the pinion gear, and a link to which the sector gear is fixed and which is rotatably coupled to the cushion frame. The link is made of a material with a lower yield stress than a material forming the sector gear.

This configuration allows the sector gear to have increased rigidity to maintain the engagement with the pinion gear, and also allows the link to have low rigidity so that the link is easily deformed at the time of impact. As a result, since energy at the time of impact can be absorbed by the deformation of the link, excessive deformation of the vehicle seat can be inhibited. Also, since the link can be made of a material with low rigidity, costs for the vehicle seat are reduced.

In one embodiment of the present disclosure, the vehicle seat may further comprise a support member arranged below the cushion frame. The link may comprise a gear attachment portion to which the sector gear is fixed, and an arm portion extending from the gear attachment portion to a seat front side. The arm portion may be rotatably coupled to the support member. The arm portion may be arranged between a coupling portion to the support member and the gear attachment portion, and have a step portion recessed in a seat-width direction. This configuration makes the deformation more likely to occur in the step portion at the time of impact. Therefore, misaligned engagement and tooth chipping due to positional deviation between the sector gear and the pinion gear can be inhibited.

In one embodiment of the present disclosure, the cushion frame may comprise a first side frame and a second side frame spaced apart from each other in the seat-width direction. The lifting device may comprise a coupling rod rotatably coupled to the first side frame and the second side frame. The link may comprise a rod attachment portion extending in the seat-width direction from the gear attachment portion and fixed to the coupling rod from below the coupling rod. This configuration inhibits the link from falling in the seat-width direction at the time of impact. As a result, energy absorption performance of the link can be increased.

In one embodiment of the present disclosure, an end of the rod attachment portion on the seat front side may be positioned on the seat front side relative to the step portion. This configuration can stabilize a mode of deformation of the link.

In one embodiment of the present disclosure, a thickness in the seat-width direction of a portion of the link to which the sector gear is fixed may be smaller than a thickness in the seat-width direction of the sector gear. This configuration can reduce material costs for the link, and thus facilitates cost reduction in vehicle seat.

In one embodiment of the present disclosure, the lifting device may comprise a fastener that secures the sector gear to the link in the seat-width direction. The link may comprise a pedestal protruding in the seat-width direction beyond the fastener. This configuration can avoid interference between the fastener and other members by the pedestal contacting the other members such as, for example, a cover.

BRIEF DESCRIPTION OF THE DRAWINGS

An example embodiment of the present disclosure will be described hereinafter with reference to the accompanying drawings, in which.

DETAILED DESCRIPTION OF EXEMPLARY EMBODIMENTS

1. First Embodiment 1-1. Configuration

Figure 1:
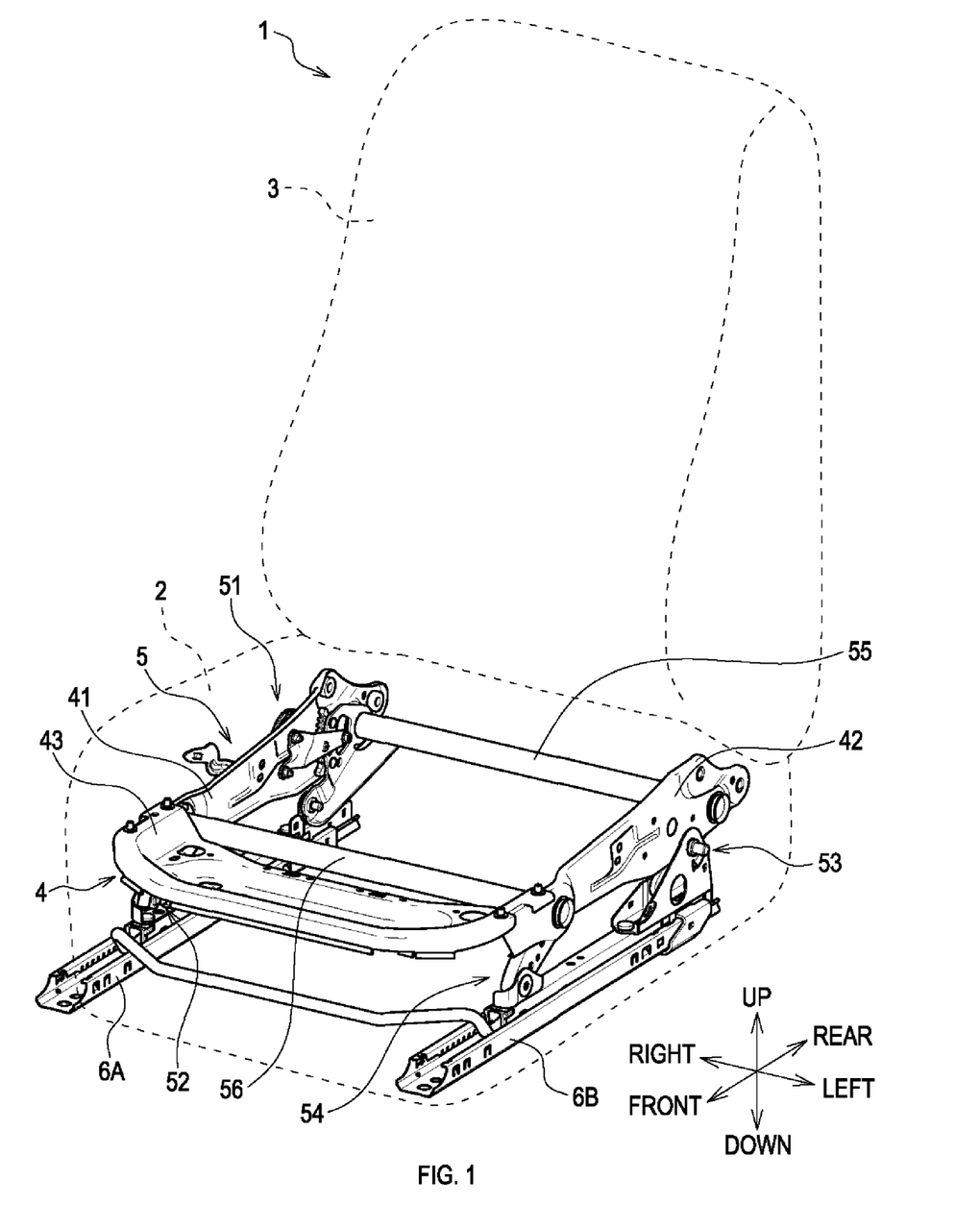
FIG. 1 is a schematic perspective view of a vehicle seat in an embodiment.

A vehicle seat 1 shown in FIG. 1 comprises a seat cushion 2, a seatback 3, a cushion frame 4, a lifting device 5, a first sliding device 6A, and a second sliding device 6B.

The vehicle seat 1 in the present embodiment is used as a seat of a passenger car. Each direction in the description below and the drawings means a direction in a state where the vehicle seat 1 is assembled to a vehicle (that is, the passenger car). Also, in the present embodiment, a seat-width direction coincides with right-left directions of the vehicle, and a seat front side coincides with a front side of the vehicle.

The seat cushion 2 supports an occupant's buttocks. The seatback 3 supports the occupant's back. The cushion frame 4 supports the seat cushion 2.

[Cushion Frame]

Figure 2A:
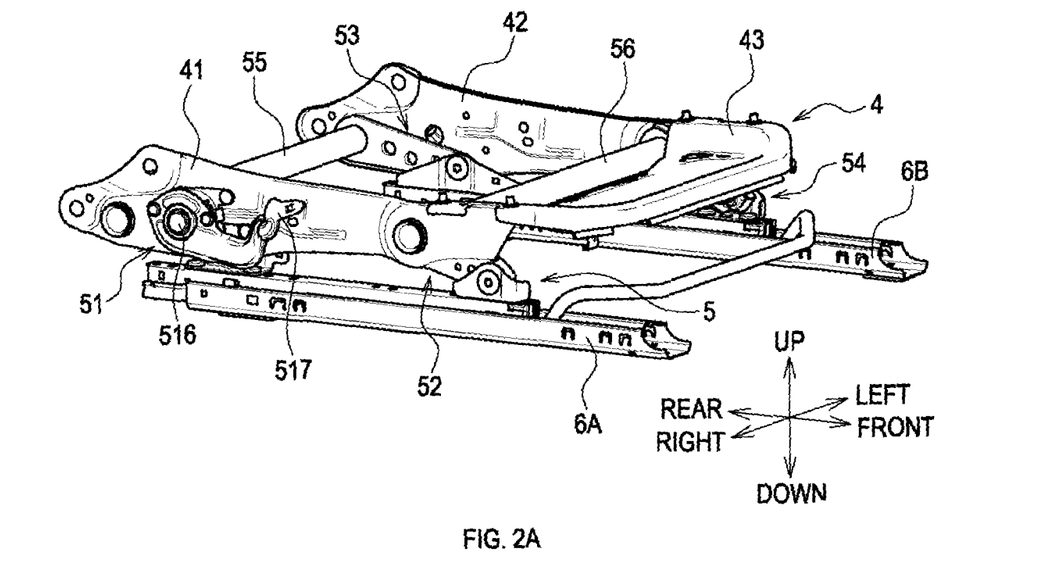
FIG. 2A is a schematic perspective view of a cushion frame and a lifting device of the vehicle seat of FIG. 1.

The cushion frame 4 comprises a first side frame 41, a second side frame 42, and a front panel 43.

Each of the first side frame 41 and the second side frame 42 is a panel-shaped member extending along seat front-rear directions. The first side frame 41 and the second side frame 42 are spaced away from each other in the seat-width direction. The first side frame 41 is positioned on the right of the second side frame 42. The front panel 43 is arranged so as to bridge over a front end of the first side frame 41 and a front end of the second side frame 42.

[Sliding Device]

Each of the first sliding device 6A and the second sliding device 6B slides the cushion frame 4 in the seat front-rear directions.

The first sliding device 6A comprises a movable rail coupled to the first side frame 41, and a fixed rail that slidably supports the movable rail. The second sliding device 6B comprises a movable rail coupled to the second side frame 42, and a fixed rail that slidably supports the movable rail.

The first sliding device 6A and the second sliding device 6B are spaced apart from each other in the seat-width direction. The first sliding device 6A is arranged to the right of the second sliding device 6B. The first sliding device 6A and the second sliding device 6B are support members arranged below the cushion frame 4.

[Lifting Device]

The lifting device 5 is configured to move the cushion frame 4 up and down, to thereby raise and lower the entire seat cushion 2. The lifting device 5 is manually driven by the occupant.

Figure 2B:
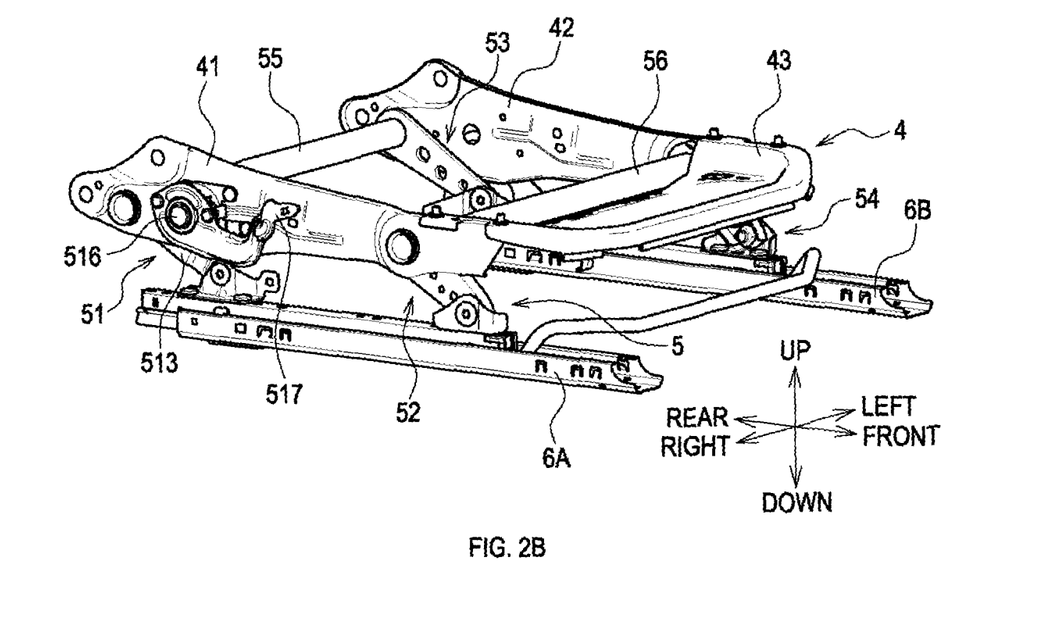
FIG. 2B is a schematic perspective view of the cushion frame and the lifting device of the vehicle seat of FIG. 1.

The lifting device 5 displaces the cushion frame 4 between a lowermost position shown in FIG. 2A and an uppermost position shown in FIG. 2B. The lifting device 5 comprises a first link mechanism 51, a second link mechanism 52, a third link mechanism 53, a fourth link mechanism 54, a first coupling rod 55, and a second coupling rod 56.

<Coupling Rod>

The first coupling rod 55 and the second coupling rod 56 are rotatably coupled to the first side frame 41 and the second side frame 42, respectively.

The first coupling rod 55 is arranged on a seat rear side relative to the second coupling rod 56. Each of the first coupling rod 55 and the second coupling rod 56 is a circular pipe arranged so that its central axis is parallel to the seat-width direction.

<First Link Mechanism>

The first link mechanism 51 couples the first side frame 41 and the movable rail of the first sliding device 6A.

Figure 3A:
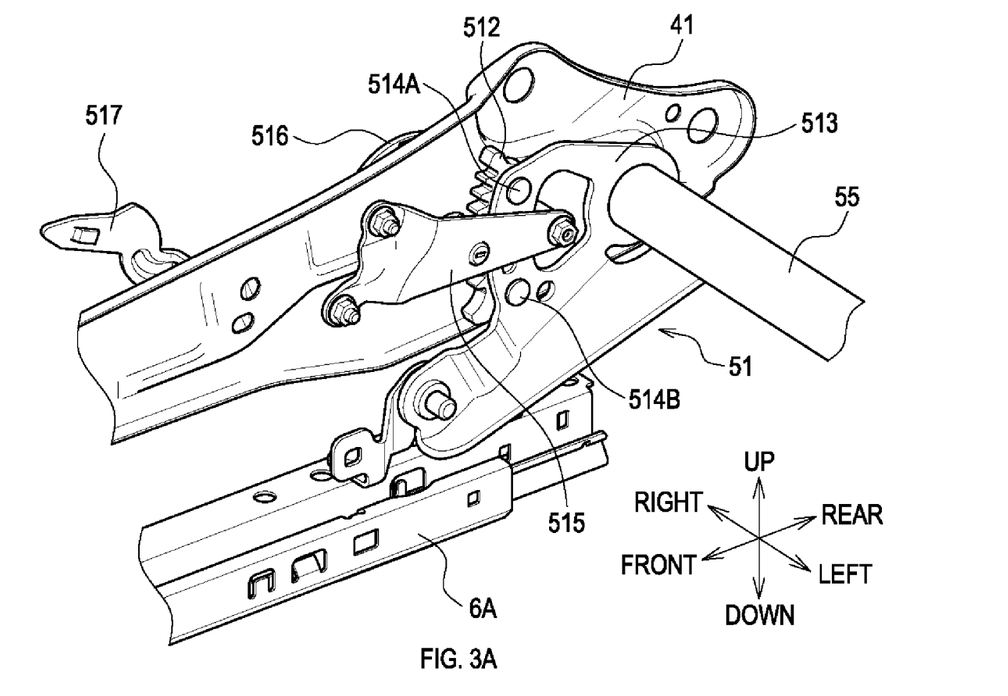
FIG. 3A is a schematic perspective view of a first link mechanism of the lifting device of FIG. 2A.
Figure 3B:
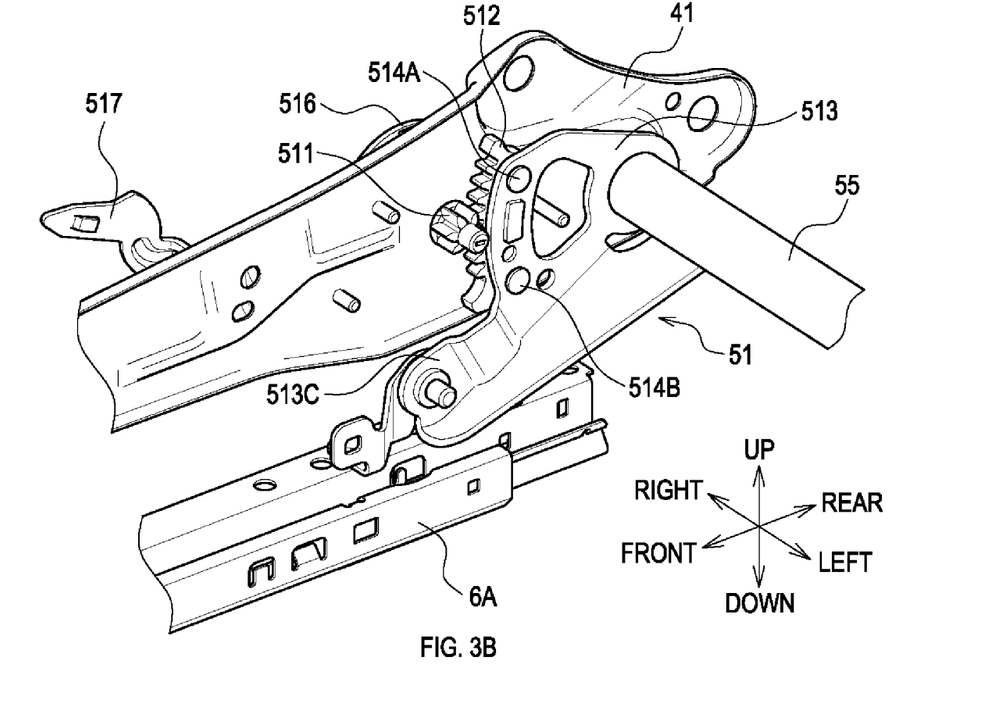
FIG. 3B is a schematic perspective view of the first link mechanism of FIG. 3A with its cover bracket removed.

As shown in FIGS. 3A and 3B, the first link mechanism 51 comprises a pinion gear 511, a sector gear 512, a link 513, a first fastener 514A, a second fastener 514B, a cover bracket 515, a brake mechanism 516, and a manipulation part 517.

<Pinion Gear>

The pinion gear 511 is coupled to the brake mechanism 516 for rotation by the brake mechanism 516. A rotational axis of the pinion gear 511 is parallel to the seat-width direction.

The pinion gear 511 is rotatably held by the first side frame 41 via the cover bracket 515 and the brake mechanism 516. The pinion gear 511 is positioned on the seat-width direction inner side (that is, on the left) relative to the first side frame 41. The pinion gear 511 is immovable relative to the first side frame 41.

The brake mechanism 516 is configured to rotate the pinion gear 511 by a driving force input from the manipulation part 517. Also, the brake mechanism 516 inhibits reversal of the pinion gear 511 due to the occupant's weight applied to the seat cushion 2. The brake mechanism 516 is fixed to the first side frame 41 on the seat-width direction outer side of the first side frame 41.

The manipulation part 517 is configured to input a driving force that raises and lowers the cushion frame 4 to the brake mechanism 516. An operation lever, for example, for the occupant to perform a lifting operation is coupled to the manipulation part 517.

<Sector Gear>

The sector gear 512 is a planar gear engaged with the pinion gear 511. A rotational axis of the sector gear 512 is parallel to a rotational axis of the pinion gear 511. The sector gear 512 is arranged on the seat rear side of the pinion gear 511.

The sector gear 512 is rotated (that is, swung) in up-down directions by rotation of the pinion gear 511 (that is, by a power transmitted from the pinion gear 511). Between the pinion gear 511 and the sector gear 512, a constant backlash is provided. The sector gear 512 is made of, for example, a quenched metal material.

The sector gear 512 is arranged on the seat-width direction inner side relative to the first side frame 41. Also, the sector gear 512 is secured to the link 513. Specifically, the sector gear 512 is attached to the link 513 from the seat-width direction outer side, and is fastened to the link 513 by the first fastener 514A and the second fastener 514B. Teeth of the sector gear 512 protrude on the seat front side relative to the link 513.

<Link>

The link 513 is a planar member rotatably coupled to the cushion frame 4 (that is, the first side frame 41), together with the sector gear 512.

The link 513 is made of, for example, an unquenched metal material. The material of the link 513 has a lower yield stress than the material of the sector gear 512. In other words, the link 513 is less rigid than the sector gear 512, and is easily deformed under load.

Figure 4:
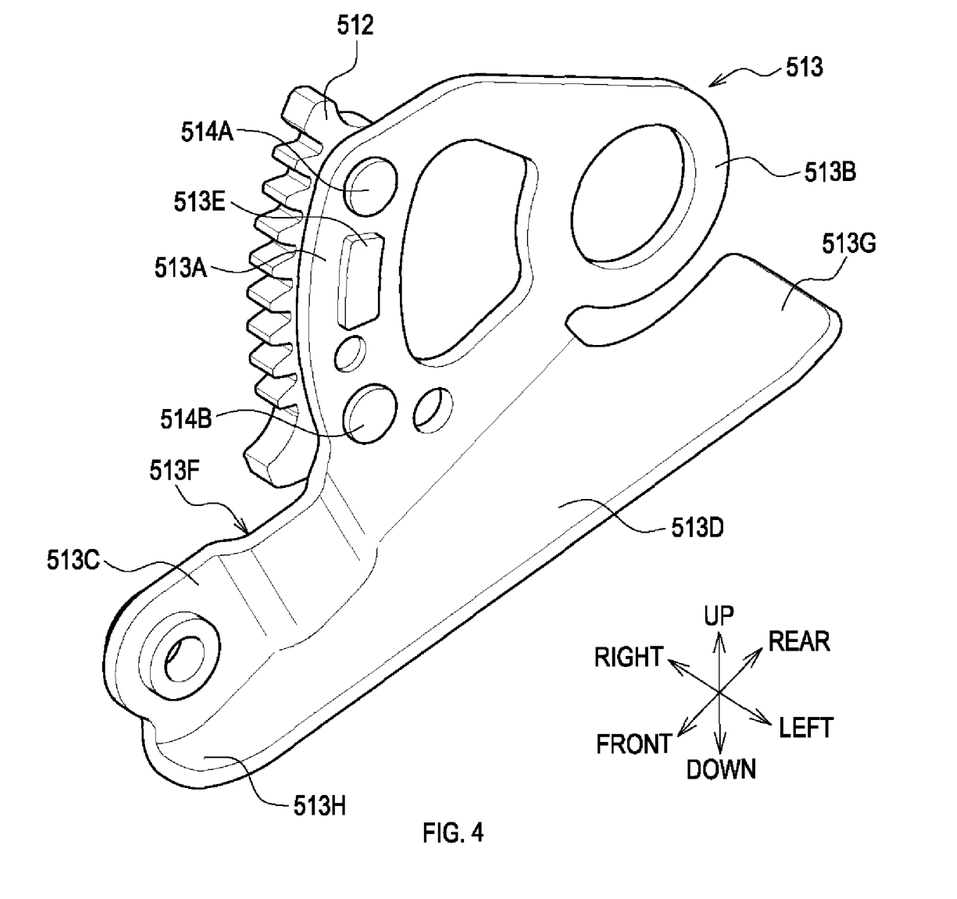
FIG. 4 is a schematic perspective view of a sector gear and a link of the first link mechanism of FIG. 3A.

As shown in FIG. 4, the link 513 comprises a gear attachment portion 513A, a rod insertion portion 513B, an arm portion 513C, a rod attachment portion 513D, and a pedestal 513E.

The gear attachment portion 513A is a portion to which the sector gear 512 is fixed. A thickness direction of the gear attachment portion 513A is parallel to the seat-width direction. A thickness of the gear attachment portion 513A in the seat-width direction is smaller than a thickness of the sector gear 512 in the seat-width direction.

The first fastener 514A and the second fastener 514B are inserted through the gear attachment portion 513A in the thickness direction. The first fastener 514A and the second fastener 514B secure the sector gear 512 to the gear attachment portion 513A in the seat-width direction.

The first fastener 514A and the second fastener 514B are spaced apart in up-down directions (specifically, along the circumferential direction of the sector gear 512). As the first fastener 514A and the second fastener 514B, for example, rivets, bolts and nuts are used.

The rod insertion portion 513B is a portion to which the first coupling rod 55 is inserted. The rod insertion portion 513B is provided on the seat rear side of the gear attachment portion 513A. The first coupling rod 55 is fixed to the rod insertion portion 513B, for example, by welding.

The arm portion 513C is a strip-shaped portion that extends from the gear attachment portion 513A to the seat front side, and is coupled to the movable rail of the first sliding device 6A which is a support member. The arm portion 513C has the same thickness as the gear attachment portion 513A.

An end of the arm portion 513C on the seat rear side is coupled to a lower end of the gear attachment portion 513A. An end of the arm portion 513C on the seat front side is rotatably coupled to the movable rail of the first sliding device 6A, as shown in FIG. 3B.

As shown in FIG. 4, the arm portion 513C has a step portion 513F arranged between a coupling portion to the movable rail of the first sliding device 6A (that is, the end of the arm portion 513C on the seat front side) and the gear attachment portion 513A (that is, the end of the arm portion 513C on the seat rear side), and recessed in the seat-width direction.

The step portion 513F is curved so as to protrude toward the seat-width direction inner side. The step portion 513F deforms first so as to absorb energy when a load is applied to the sector gear 512 or the link 513.

The step portion 513F extends from an upper end of the arm portion 513C to a lower end of the arm portion 513C (that is, to the rod attachment portion 513D). A thickness direction of the arm portion 513C, except for the step portion 513F, is parallel to the seat-width direction.

The rod attachment portion 513D is a planar portion that extends from the lower ends of the gear attachment portion 513A and the arm portion 513C toward the seat-width direction inner side. The plate surface of the rod attachment portion 513D is parallel to the seat-width direction. The rod attachment portion 513D is a portion obtained by bending a lower end of the plate material forming the link 513 in the seat-width direction inner side and upward. The rod attachment portion 513D has the same thickness as the gear attachment portion 513A and the arm portion 513C.

Figure 5:
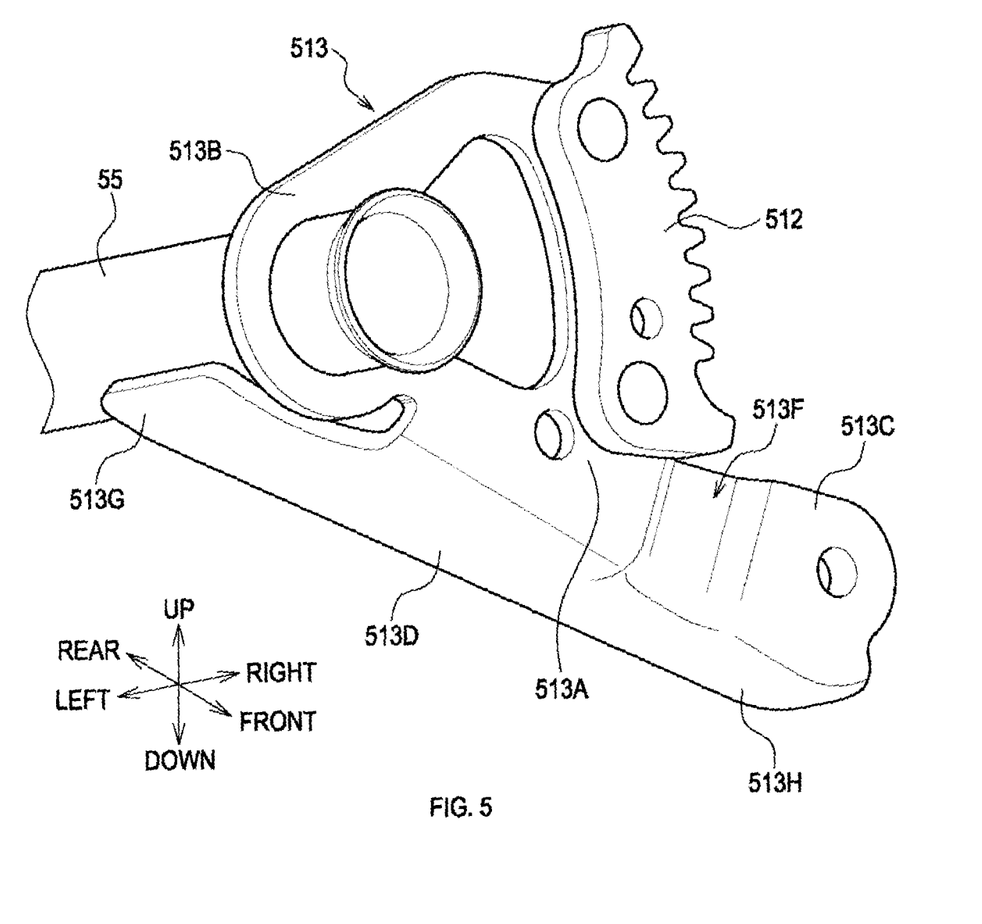
FIG. 5 is a schematic perspective view of the sector gear and the link of FIG. 4 in a state fixed to a first coupling rod.

The rod attachment portion 513D has a first end 513G on the seat rear side and a second end 513H on the seat front side. The first end 513G, as shown in FIG. 5, is fixed to the first coupling rod 55 from below the first coupling rod 55, for example, by welding. The first end 513G is spaced apart from the rod insertion portion 513B in the seat-width direction.

The second end 513H is positioned on the seat front side relative to the step portion 513F. The second end 513H is continuous with the end of the arm portion 513C on the seat front side. The second end 513H has a width (that is, the length in the seat-width direction) smaller than the first end 513G.

The pedestal 513E shown in FIG. 4 is a portion protruding inward in the seat-width direction beyond the first fastener 514A and the second fastener 514B from the gear attachment portion 513A. In other words, a thickness of a region of the link 513 where the pedestal 513E is provided is greater than a sum of the thickness of the gear attachment portion 513A and a thickness of a head portion of the first fastener 514A or the second fastener 514B.

The link 513 and the sector gear 512 rotate with the first coupling rod 55 with respect to the first side frame 41. Also, the link 513 and the sector gear 512 rotate with respect to the first sliding device 6A. Specifically, the link 513 and the sector gear 512 swing in the up-down directions with respect to each of the first side frame 41 and the first sliding device 6A.

When the pinion gear 511 rotates so that the sector gear 512 swings upward, the link 513 swings up as if to stand. This raises the cushion frame 4. On the other hand, when the pinion gear 511 rotates so that the sector gear 512 swings downward, the link 513 swings down as if to fall. This lowers the cushion frame 4.

<Cover Bracket>

The cover bracket 515 shown in FIG. 3A is a planar member. The sector gear 512 is arranged between the cover bracket 515 and the first side frame 41 in the seat-width direction.

The cover bracket 515 covers, from the seat-width direction inner side, the entire pinion gear 511 and an engagement portion of the sector gear 512 engaged with the pinion gear 511. The cover bracket 515 is fastened to the first side frame 41 by bolts and nuts.

A surface on the seat-width direction outer side of the cover bracket 515 (that is, a surface opposed to the sector gear 51) contacts the pedestal 513E of the link 513, and thus does not contact the head portions of the first fastener 514A and the second fastener 514B. This inhibits rattling of the cover bracket 515.

<Second Link Mechanism, Third Link Mechanism and Fourth Link Mechanism>

The second link mechanism 52 shown in FIG. 2A couples the first side frame 41 and the movable rail of the first sliding device 6A on the seat front side with respect to the first link mechanism 51. The second link mechanism 52 works together with the first link mechanism 51 to move the first side frame 41 up and down.

The third link mechanism 53 and the fourth link mechanism 54 are respectively coupled to the second side frame 42 and the movable rail of the second sliding device 6B. The third link mechanism 53 is coupled to the first link mechanism 51 by the first coupling rod 55. The third link mechanism 53 is synchronized with the first link mechanism 51 to operate. The fourth link mechanism 54 is coupled to the second link mechanism 52 by the second coupling rod 56. The fourth link mechanism 54 is synchronized with the second link mechanism 52 to operate.

1-2. Effect

According to the embodiment detailed as above, the following effects can be obtained.

(1a) While the rigidity of the sector gear 512 is increased to maintain the engagement with the pinion gear 511, the link 513 can be less rigid so that the link 513 is easily deformed at the time of impact. As a result, since energy at the time of impact can be absorbed by the deformation of the link 513, excessive deformation of the vehicle seat 1 can be inhibited. Also, since the link 513 can be made of a material with low rigidity, costs for the vehicle seat 1 are reduced.

(1b) The arm portion 513C has the step portion 513F. Thus, deformation is more likely to occur in the step portion 513F at the time of impact. Therefore, misalignment of engagement and tooth chipping due to positional deviation between the sector gear 512 and the pinion gear 511 can be inhibited.

(1c) The link 513 has the rod attachment portion 513D. Thus, the link 513 is inhibited from falling in the seat-width direction at the time of impact. As a result, energy absorption performance of the link 513 can be increased.

(1d) The second end 513H of the rod attachment portion 513D is positioned on the seat front side relative to the step portion 513F. Thus, the mode of deformation of the link 513 can be stabilized.

(1e) The thickness of the gear attachment portion 513A of the link 513 is smaller than the thickness of the sector gear 512. Thus, the material cost for the link 513 can be reduced. Accordingly, cost reduction of the vehicle seat 1 is facilitated.

(1f) The pedestal 513E of the link 513 contact the cover bracket 515. Thus, the first fastener 514A and the second fastener 514B can avoid interference with the cover bracket 515.

2. Other Embodiments

Although one embodiment of the present disclosure has been described above, it is to be understood that the present disclosure is not limited to the embodiment above, but may be implemented in various forms.

(2a) In the vehicle seat of the aforementioned embodiment, the end of the rod attachment portion on the seat front side does not necessarily have to be positioned on the seat front side relative to the step portion.

(2b) In the vehicle seat of the aforementioned embodiment, the arm portion does not necessarily have a step portion.

(2c) In the vehicle seat of the aforementioned embodiment, the link does not necessarily have a rod attachment portion and a pedestal.

(2d) In the vehicle seat of the aforementioned embodiment, the thickness of the gear attachment portion may be equal to or greater than the thickness of the sector gear or more.

(2e) In the vehicle seat of the aforementioned embodiment, the pinion gear may be configured to be rotated by a power source such as an actuator.

(2f) In the vehicle seat of the aforementioned embodiment, the configuration of the first link mechanism may be applied to a tilting device which swings a portion (for example, a front end) of the seat cushion in the up-down directions. In other words, the present disclosure may be also applied to a vehicle seat comprising a tilting device.

(2g) The vehicle seat of the aforementioned embodiment may also be applied to a seat for use in automobiles other than passenger cars, or in any vehicles other than automobiles, such as railway vehicles, ships and boats, and aircrafts.

(2h) It may be possible to divide a function performed by one element in the aforementioned embodiments to a plurality of elements, or to integrate functions of a plurality of elements into one element. Also, the configurations in the aforementioned embodiments may be partly omitted. Further, at least a portion of a configuration in the aforementioned embodiments may be added to, or may be replaced with another configuration of the aforementioned embodiments. Any form that falls within the scope of the technical ideas defined by the language of the appended claims may be an embodiment of the present disclosure.

What is claimed is:

1. A vehicle seat, comprising:
a seat cushion;
a cushion frame supporting the seat cushion;
a support member arranged below the cushion frame; and
a lifting device configured to raise and lower at least a portion of the seat cushion,
wherein the lifting device includes:
  a pinion gear held by the cushion frame;
  a sector gear engaged with the pinion gear; and
  a link to which the sector gear is fixed, the link being rotatably coupled to the cushion frame,
wherein the link is made of a material with a lower yield stress than a material forming the sector gear,
wherein the link includes:
  a gear attachment portion to which the sector gear is fixed; and
  an arm portion extending from the gear attachment portion to a seat front side, the arm portion being rotatably coupled to the support member,
wherein the arm portion is arranged between a coupling portion to the support member and the gear attachment portion, and has a step portion recessed in a seat-width direction, and
wherein the step portion extends from an upper end of the arm portion to a lower end of the arm portion.

2. The vehicle seat according to claim 1,
wherein a thickness in the seat-width direction of a portion of the link to which the sector gear is fixed is smaller than a thickness in the seat-width direction of the sector gear.

3. A vehicle seat, comprising:
a seat cushion;
a cushion frame supporting the seat cushion; and
a lifting device configured to raise and lower at least a portion of the seat cushion,
wherein the lifting device includes:
  a pinion gear held by the cushion frame;
  a sector gear engaged with the pinion gear; and
  a link to which the sector gear is fixed, the link being rotatably coupled to the cushion frame,
wherein the link is made of a material with a lower yield stress than a material forming the sector gear,
wherein the cushion frame includes a first side frame and a second side frame spaced apart from each other in the seat-width direction,
wherein the lifting device further includes a coupling rod rotatably coupled to the first side frame and the second side frame, and
wherein the link includes:
  a gear attachment portion to which the sector gear is fixed;
  a rod attachment portion extending in the seat-width direction from the gear attachment portion and fixed to the coupling rod from below the coupling rod; and
  a rod insertion portion to which the coupling rod is inserted at a position away from the rod attachment portion.

4. The vehicle seat according to claim 3,
wherein an end of the rod attachment portion on the seat front side is positioned on the seat front side relative to the step portion.

5. A vehicle seat, comprising:
a seat cushion;
a cushion frame supporting the seat cushion; and
a lifting device configured to raise and lower at least a portion of the seat cushion,
wherein the lifting device includes:
  a pinion gear held by the cushion frame;
  a sector gear engaged with the pinion gear; and
  a link to which the sector gear is fixed, the link being rotatably coupled to the cushion frame,
wherein the link is made of a material with a lower yield stress than a material forming the sector gear, wherein the lifting device further includes a fastener that secures the sector gear to the link in the seat-width direction, wherein the link includes a pedestal protruding in the seat-width direction beyond the fastener, and wherein the pedestal protrudes inward in the seat-width direction and is provided at a position where the pedestal overlaps with the sector gear in the seat-width direction.

\* \* \* \* \*